US010875932B2

(12) United States Patent
Higuchi et al.

(10) Patent No.: US 10,875,932 B2
(45) Date of Patent: Dec. 29, 2020

(54) CELLULOSE ACETATE POWDER AND METHOD OF PRODUCING CELLULOSE ACETATE POWDER

(71) Applicant: DAICEL CORPORATION, Osaka (JP)

(72) Inventors: Akihiro Higuchi, Himeji (JP); Takehiro Matsumoto, Himeji (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 15/553,669

(22) PCT Filed: Feb. 26, 2015

(86) PCT No.: PCT/JP2015/001007
§ 371 (c)(1),
(2) Date: Aug. 25, 2017

(87) PCT Pub. No.: WO2016/135778
PCT Pub. Date: Sep. 1, 2016

(65) Prior Publication Data
US 2018/0037670 A1    Feb. 8, 2018

(51) Int. Cl.
*C08B 3/06* (2006.01)
*C08L 1/12* (2006.01)

(52) U.S. Cl.
CPC ............... *C08B 3/06* (2013.01); *C08L 1/12* (2013.01); *C08L 2205/18* (2013.01)

(58) Field of Classification Search
CPC .................................... C08B 3/06; C08L 1/12
USPC ....................... 536/69, 76, 77, 124
See application file for complete search history.

(56) References Cited

U.S. PATENT DOCUMENTS

| | | | | |
|---|---|---|---|---|
| 4,228,276 A * | 10/1980 | Kuo | ............ | C08B 3/28 536/69 |
| 5,977,346 A | 11/1999 | Saka et al. | | |
| 8,783,860 B2 * | 7/2014 | Orsi Mazzucchelli | ............ | B29D 12/02 351/41 |
| 2009/0171079 A1 | 7/2009 | Higuchi | | |
| 2009/0247739 A1 | 10/2009 | Nozoe et al. | | |
| 2012/0172585 A1 | 7/2012 | Shimamoto et al. | | |
| 2012/0292580 A1 * | 11/2012 | Takagi | ............ | C08L 1/12 252/582 |
| 2015/0141639 A1 | 5/2015 | Toyama et al. | | |
| 2016/0032020 A1 | 2/2016 | Ukita et al. | | |

FOREIGN PATENT DOCUMENTS

| | | | |
|---|---|---|---|
| EP | 2599827 A1 * | 6/2013 | ........ C08L 1/12 |
| JP | 2-311501 A | 12/1990 | |
| JP | 3-205401 A | 9/1991 | |
| JP | 6-157601 A | 6/1994 | |
| JP | 2000-212201 A | 8/2000 | |
| JP | 2000-212202 A | 8/2000 | |
| JP | 2001-261701 A | 9/2001 | |
| JP | 2002-128903 A | 5/2002 | |
| JP | 2007-112870 A | 5/2007 | |
| JP | 2008-542473 A | 11/2008 | |
| JP | 2009-155555 A | 7/2009 | |
| JP | 2009-235212 A | 10/2009 | |
| JP | 2009-242592 A | 10/2009 | |
| JP | 2011-158664 A | 8/2011 | |
| JP | 2013-76057 A | 4/2013 | |
| JP | 2013-112821 A | 6/2013 | |
| JP | 6063605 B1 | 1/2017 | |
| WO | WO 2006/127830 A1 | 11/2006 | |
| WO | WO 2013/180278 A1 | 12/2013 | |
| WO | WO 2014/142166 A1 | 9/2014 | |

OTHER PUBLICATIONS

Final Rejection for JP 2016-500840 dated Jul. 26, 2016.
International Search Report for PCT/JP2015/001007 dated Mar. 31, 2015.
Notice of Allowance for JP 2016-500840 dated Nov. 22, 2016.
Office Action for JP 2016-500840 dated Mar. 15, 2016.
Written Opinion of the International Searching Authority for PCT/JP2015/001007 (PCT/ISA/237) dated Mar. 31, 2015.

* cited by examiner

*Primary Examiner* — Shaojia A Jiang
*Assistant Examiner* — Everett White
(74) *Attorney, Agent, or Firm* — Birch, Stewart, Kolasch & Birch, LLP

(57) ABSTRACT

Provided is a cellulose acetate powder that makes it possible to reduce the formation of spotty patches on a formed article of the cellulose acetate and prevent lowering of the production process passability of the formed article. A cellulose acetate powder includes cellulose acetate having an acetylation degree of 53 to 56% and a 6% viscosity of 30 to 200 mPa·s. In the cellulose acetate powder, a cumulative pore volume is not less than 0.200 ml/g; a proportion of particles having a particle diameter of not less than 500 μm is not higher than 40%; and an angle of repose is not greater than 51°.

8 Claims, No Drawings

CELLULOSE ACETATE POWDER AND METHOD OF PRODUCING CELLULOSE ACETATE POWDER

TECHNICAL FIELD

The present invention relates to a cellulose acetate powder and a method of producing the cellulose acetate powder.

BACKGROUND ART

Generally speaking, cellulose acetate in its primary form is poor in terms of thermoplasticity. Usually, thermoplasticity can be imparted to cellulose acetate by adding a plasticizer thereto, and thereby thermoforming of the cellulose acetate is made possible.

For example, Patent Literature 1 discloses making a plasticizer absorbed into cellulose acetate pellets and forming the resulting pellets into a formed article. Patent Literature 2 discloses: a cellulose acetate plasticizing step of mixing cellulose acetate flakes or powder with a plasticizer mixture; and a forming step of subjecting the resulting mixture to forming.

CITATION LIST

Patent Literature

PTL 1: Japanese National Phase PCT Laid-Open Application Publication No. 2008-542473
PTL 2: Japanese Laid-Open Patent Application Publication No. 2013-112821

SUMMARY OF INVENTION

Technical Problem

Thermoforming of, for example, cellulose acetate flakes or powder can be made easier by adding a plasticizer thereto. However, the inventors of the present invention have found that the addition of the plasticizer may cause formation of spotty patches on a formed article of the cellulose acetate and/or lower the production process passability, i.e., the ability to go through a production process smoothly, of the formed article. An objective of the present invention is to provide a cellulose acetate powder that makes it possible to reduce the formation of spotty patches on the formed article and prevent lowering of the production process passability of the formed article.

Solution to Problem

A first aspect of the present invention relates to a cellulose acetate powder including cellulose acetate having an acetylation degree of 53 to 56% and a 6% viscosity of 30 to 200 mPa·s. In the cellulose acetate powder, a cumulative pore volume is not less than 0.200 ml/g; a proportion of particles having a particle diameter of not less than 500 μm is not higher than 40%; and an angle of repose is not greater than 51°.

A second aspect of the present invention relates to a method of producing a cellulose acetate powder, the method including: mixing a cellulose acetate-containing reaction mixture with water or dilute acetic acid to obtain a precipitate of the cellulose acetate; and grinding the precipitate.

Advantageous Effects of Invention

The cellulose acetate powder according to the present invention makes it possible to reduce the formation of spotty patches on a formed article of the cellulose acetate and prevent lowering of the production process passability of the fixated article.

DESCRIPTION OF EMBODIMENTS

Hereinafter, a specific description of one example of a preferred embodiment is given.

A cellulose acetate powder according to the present disclosure is preferably made of cellulose acetate having an acetylation degree of 53 to 56% and a 6% viscosity of 30 to 200 mPa·s. Preferably, the cellulose acetate powder has a cumulative pore volume of not less than 0.200 ml/g; the proportion of particles having a particle diameter of not less than 500 μm in the cellulose acetate powder is not higher than 40%; and the cellulose acetate powder has an angle of repose of not greater than 51°.

[Acetylation Degree]

The acetylation degree of the cellulose acetate according to the present disclosure is preferably 53 to 56%, more preferably 53.7 to 55.7%, and even more preferably 54.0 to 55.4%. If the acetylation degree is lower than 53%, the dimensional stability, humidity resistance, thermal resistance, etc., of a formed article of the cellulose acetate are reduced. If the acetylation degree is higher than 56%, the formed article becomes brittle although its strength is excellent; here, for example, in a case where the cellulose acetate is to be used as a fibrous material for clothing or the like or as a formed article such as a frame of eyeglasses or sunglasses, if a large amount of plasticizer is added to the cellulose acetate in order to obtain softness such as suitable ductility, then it is highly possible that bleed out occurs.

The acetylation degree herein means the amount of bonded acetic acid per cellulose unit weight. The acetylation degree can be determined through measurement and calculation of the degree of acetylation according to ASTM: D-817-91 (which prescribes test methods of testing cellulose acetate, etc.).

[6% Viscosity]

The 6% viscosity of the cellulose acetate according to the present disclosure is preferably 30 to 200 mPa·s, more preferably 50 to 180 mPa·s, and even more preferably 70 to 160 mPa·s. If the 6% viscosity is lower than 30 mPa·s, the fluidity of the cellulose acetate is excessively high in injection molding, and it is highly possible that the cellulose acetate leaks out of the mold. On the other hand, if the 6% viscosity is higher than 200 mPa·s, the fluidity of the cellulose acetate is low in injection molding, and it is possible that the surface smoothness of the formed article deteriorates.

The 6% viscosity herein is determined in the following manner: dissolve the cellulose acetate in a 95% aqueous solution of acetone to obtain a 6 wt/vol % solution; measure the flow time of the obtained solution by using an Ostwald viscometer; and determine the 6% viscosity based on the measured flow time.

[Cumulative Pore Volume]

The cumulative pore volume of the cellulose acetate powder according to the present disclosure is preferably not less than 0.200 ml/g, more preferably not less than 0.300 ml/g, and even more preferably not less than 0.500 ml/g. In a case where the cumulative pore volume is less than 0.200 ml/g, in the process of producing a formed article of the cellulose acetate, if a large amount of plasticizer is added to the cellulose acetate powder to reduce the risk of formation of spotty patches on the formed article and the resulting cellulose acetate powder is fed into an extruder by using a hopper, then a bridge tends to occur in the hopper, resulting in lowered production process passability. Although the more the cumulative pore volume, the more preferable it is, the cumulative pore volume may be, for example, not more than 1.500 ml/g, not more than 1.200 ml/g, or not more than 1.000 ml/g.

The cumulative pore volume herein is determined by mercury intrusion porosimetry. The cumulative pore volume can be measured by using, for example, a mercury porosimeter (PoreMaster 60 manufactured by Quantachrome Instruments).

[Particle Size]

The particle size of the cellulose acetate powder according to the present disclosure is such that the proportion of particles having a particle diameter of not less than 500 μm in the cellulose acetate powder is preferably not higher than 40%, more preferably not higher than 10%, and even more preferably not higher than 2%. If the proportion of particles having a particle diameter of not less than 500 μm is higher than 40%, spotty patches tend to be formed on the formed article. As the particle size of the cellulose acetate powder, the lower the proportion of particles having a particle diameter of not less than 500 μm, the more preferable it is. However, the proportion of particles having a particle diameter of not less than 500 μm may be not lower than 0.1%, for example. Here, the proportion (%) of particles having a particle diameter of not less than 500 μm can be determined by using sieves specified by JIS Z 8801. Specifically, by use of a sieve with an opening size of 500 μm, one or more sieves with an opening size of greater than 500 μM, and a receiver pan, which are attached to a Ro-tap machine (manufactured by SIEVE FACTORY IIDA CO., LTD.; a tapping rate of 156 times/min and a rolling rate of 290 times/min), 100 g of a sample may be shaken with the Ro-tap machine for five minutes, and then the powder weights on the respective sieves may be summed up. Then, the proportion of the sum of the weights to the total weight (sample 100 g) may be calculated. In this manner, the proportion of particles having a particle diameter of not less than 500 μm can be determined.

The particle diameter herein is indicated as a median diameter $d_{50}$. The median diameter $d_{50}$ can be determined by the following measuring method using sieves specified by JIS Z 8801. Specifically, sieves with opening sizes of 4,000 μm, 1,700 μm, 1,000 μm, 840 μm, 500 μm, 300 μm, 150 μm, and 50 μm, and a receiver pan are prepared. The sieve with an opening size of 4,000 μm is attached to a Ro-tap machine (manufactured by SIEVE FACTORY IIDA CO., LTD.; a tapping rate of 156 times/min and a rolling rate of 290 times/min), and 100 g of a sample is sieved by shaking with the Ro-tap machine for five minutes. Then, the sample on the receiver pan is put into the sieve with an opening size of 1,700 μm and sieved in the same manner, and thereafter, sequentially subjected to sieving by the sieves with opening sizes of 1,000 μm, 840 μm, 500 μM, 300 μm, 150 μm, and 50 μm. A particle size distribution is created from a relationship between each sieve opening size and the proportion of the powder weight on the sieve of the opening size to the total powder weight (100 g) on the sieves, and a sieve opening size at the 50% cumulative weight percentage is defined as the median diameter $d_{50}$.

[Angle of Repose]

The angle of repose of the cellulose acetate powder according to the present disclosure is preferably not greater than 51°, more preferably not greater than 49°, and even more preferably not greater than 48°. In a case where the angle of repose is greater than 51°, in the process of producing a cellulose acetate formed article, if a large amount of plasticizer is added to the cellulose acetate powder to reduce the risk of formation of spotty patches on the formed article and the resulting cellulose acetate powder is fed into an extruder by using a hopper, then a bridge tends to occur in the hopper, resulting in lowered production process passability.

The angle of repose herein means an angle that is, when the powder is in free fall onto a horizontal plane, formed by the horizontal plane and the generatrix of a cone formed by the powder piled up on the horizontal place. The angle of repose of the powder can be measured by an angle of repose measuring device (e.g., one manufactured by Hosokawa Micron Corporation; trade name "Powder Tester TYPE PT-E").

[Plasticizer]

A plasticizer can be added and adsorbed to the cellulose acetate powder of the present disclosure.

Examples of the plasticizer include: aromatic carboxylate esters (e.g., phthalic acid di-$C_{1-12}$ alkyl esters such as dimethyl phthalate, diethyl phthalate, dibutyl phthalate, dihexyl phthalate, dioctyl phthalate, and di(2-ethylhexyl) phthalate, phthalic acid $C_{1-6}$ alkoxy $C_{1-12}$ alkyl esters such as dimethoxyethyl phthalate, phthalic acid $C_{1-12}$ alkylaryl-$C_{1-3}$ alkyl esters such as butyl benzyl phthalate, $C_{1-6}$ alkylphthalyl $C_{2-4}$ alkylene glycolates such as ethylphthalyl ethylene glycolate and butylphthalyl butylene glycolate, trimellitic acid tri-$C_{1-12}$ alkyl esters such as trimethyl trimellitate, triethyl trimellitate, trioctyl trimellitate, and tri-2-ethylhexyl trimellitate, and pyromellitic acid tetra-$C_{1-12}$ alkyl esters such as tetraoctyl pyromellitate); phosphate esters (e.g., tributyl phosphate, tricresyl phosphate, and triphenyl phosphate); fatty acid esters (e.g., adipic acid esters such as dibutyl adipate, dioctyl adipate, butoxyethoxy ethyl•benzyl adipate, and dibutoxyethoxyethyl adipate, azelaic acid esters such as diethyl azelate, dibutyl azelate, and dioctyl azelate, sebacic acid esters such as dibutyl sebacate and dioctyl sebacate, butyl oleate, and methyl acetyl ricinoleate); lower fatty acid esters (e.g., triacetin and diglycerine tetraacetate) of polyhydric alcohols (such as glycerol, trimethylolpropane, pentaerythritol, and sorbitol); glycol esters (e.g., dipropylene glycol dibenzoate); citric acid esters (e.g., acetyl tributyl citrate); amides (e.g., N-butyl benzene sulfonamide); and ester oligomers (e.g., caprolactone oligomer). These plasticizers may be used alone or in a combination of two or more kinds thereof.

Among these plasticizers, it is preferable to use diethyl phthalate, triphenyl phosphate, or triacetin since these plasticizers are highly compatible with cellulose acetate.

Even if up to about 40 parts by weight of these plasticizers are added to 100 parts by weight of the cellulose acetate powder according to the present disclosure, the production process passability of the formed article is hardly lowered. One example situation where the production process passability of the formed article is lowered is as follows: in the process of producing a cellulose acetate formed article, when the cellulose acetate powder with a plasticizer added thereto is fed into an extruder by using a hopper, a bridge occurs in the hopper. The additive amount of the plasticizer added to 100 parts by weight of the cellulose acetate powder according to the present disclosure is preferably 20 to 40 parts by weight, more preferably 24 to 36 parts by weight, and even more preferably 26 to 34 parts by weight with respect to 100 parts by weight of the cellulose acetate. If the additive amount of the plasticizer is less than 20 parts by weight, spotty patches tend to be formed on the formed article. If the additive amount of the plasticizer is more than 40 parts by weight, the bending strength of the formed article is lowered.

In the present disclosure, the spotty patches mean colorless or non-transparent spots on the surface of the formed article, which are visually distinguishable from normal transparent portions.

[Production of Cellulose Acetate Powder]

Hereinafter, a method of producing the cellulose acetate powder is described in detail. The cellulose acetate powder according to the present disclosure can be produced through a series of production steps including: (i) an activating step of adding acetic acid or acetic acid containing 1 to 10% by weight of sulfuric acid (i.e., sulfur-containing acetic acid) to raw material cellulose by one-stage or two-stage addition to subject the cellulose to, pretreatment activation; (ii) an acetylating step of acetylating, in the presence of a sulfuric acid catalyst, the cellulose that has been subjected to the pretreatment activation; a saponifying and ripening step (iii) of partially neutralizing the sulfuric acid catalyst and ripening the acetylated cellulose in the presence of the sulfuric acid catalyst (or the remaining sulfuric acid); a purifying and drying step (iv); and a grinding step (v). It should be noted that a general cellulose acetate production method can be found in the following publication: MIGITA et al., "Mokuzai Kagaku (Wood Chemistry)", first volume, Kyoritsu Publishing Company Inc., 1968, pp. 180 to 190.

(Raw Material Cellulose)

For example, wood pulp (softwood pulp, hardwood pulp) or cotton linters can be used as cellulose (pulp) that serves as the raw material of the cellulose acetate powder of the present disclosure. These kinds of cellulose may be used alone or in a combination of two or more kinds thereof. For example, softwood pulp may be used together with cotton linters or hardwood pulp.

Linter pulp is preferable for the following reasons. Linter pulp has high cellulose purity and contains less coloring components, and therefore, with the use of linter pulp, the transparency of the formed article is increased.

Wood pulp is preferable for the following reasons. Wood pulp realizes stable supply of the raw material, and is more advantageous than linters in terms of cost.

One example of the wood pulp is hardwood pre-hydrolyzed kraft pulp. Disintegrated wood pulp that is obtained by disintegrating the hardwood pre-hydrolyzed kraft pulp or the like into a cotton-like form can be used. The disintegration of the pulp can be performed by using a disc refiner, for example.

It should be noted that the a cellulose content in the raw material cellulose is preferably not less than 90% by weight so that the amount of insoluble residue will be small and the transparency of the formed article will not be impaired.

(Production Process)

If the raw material cellulose is supplied in such a form that it is not easy to process in the following steps, for example, a case where the raw material cellulose is supplied in the form of a sheet, it is preferable that the raw material cellulose undergo a dry disintegration step. In the activating step (i) of adding acetic acid or acetic acid containing 1 to 10% by weight of sulfuric acid (i.e., sulfur-containing acetic acid) to the disintegrated raw material cellulose to subject the cellulose to pretreatment activation, preferably, 10 to 500 parts by weight of the acetic acid and/or the sulfur-containing acetic acid can be added to 100 parts by weight of the raw material cellulose. Examples of the method of adding the acetic acid and/or the sulfur-containing acetic acid to the cellulose include: a method in which the acetic acid or the sulfur-containing acetic acid is added in one stage; and a method in which the acetic acid or the sulfur-containing acetic acid is added in two or more stages separately, such as a method in which the acetic acid is added first, and after a certain period of time has elapsed, the sulfur-containing acetic acid is added, or a method in which the sulfur-containing acetic acid is added first, and after a certain period of time has elapsed, the acetic acid is added. A specific way of adding the acetic acid and/or the sulfur-containing acetic acid to the cellulose is, for example, mixing the cellulose with the acetic acid and/or the sulfur-containing acetic acid sprayed thereon.

After the acetic acid and/or the sulfur-containing acetic acid is added to the cellulose, the pretreatment activation can be performed, for example, by leaving the mixture to stand for 0.2 to 48 hours at 17 to 40° C., or by stirring the mixture in a sealed condition for 0.1 to 24 hours at 17 to 40° C.

In the acetylating step (ii) of acetylating, in the presence of a sulfuric acid catalyst, the cellulose that has been subjected to the pretreatment activation, the acetylation can be initiated, for example, by adding the cellulose that has been subjected to the pretreatment activation to a mixture of acetic acid, acetic anhydride, and sulfuric acid, or by adding sulfuric acid and a mixture of acetic acid and acetic anhydride to the cellulose that has been subjected to the pretreatment activation.

In the case of preparing the mixture of acetic acid and acetic anhydride, the mixture can be prepared without any particular restrictions, so long as the mixture contains acetic acid and acetic anhydride. However, regarding the proportions of acetic acid and acetic anhydride in the mixture, preferably, 200 to 400 parts by weight of acetic anhydride is mixed with 300 to 600 parts by weight of acetic acid, and more preferably, 240 to 280 parts by weight of acetic anhydride is mixed with 350 to 530 parts by weight of acetic acid.

Regarding the proportions of cellulose, the mixture of acetic acid and acetic anhydride, and sulfuric acid in the acetylation reaction, the mixture of acetic acid and acetic anhydride is preferably in an amount of 500 to 1,000 parts by weight with respect to 100 parts by weight of the cellulose, and the concentrated sulfuric acid is preferably in an amount of 5 to 15 parts by weight, more preferably 7 to 13 parts by weight, and even more preferably 8 to 11 parts by weight with respect to 100 parts by weight of the cellulose.

In the acetylating step (ii), the acetylation reaction of the cellulose can be performed by stirring at 20 to 55° C. for 30 minutes to 36 hours since the initiation of the acetylation.

The acetylation reaction of the cellulose can be performed, for example, under the stirring condition by increasing the temperature to 20 to 55° C. by taking five minutes to 36 hours since the initiation of the acetylation, or under the stirring condition by applying no external heat to the inside or outside of the reaction system. The acetylation reaction is initially a reaction in a solid-liquid heterogeneous system, and it is desirable to increase the temperature by taking as much time as possible so as to facilitate the acetylation reaction and reduce unreacted components while suppressing depolymerization reaction. However, from the viewpoint of productivity, it is preferable to increase the temperature by taking not more than two hours, and it is more preferable to increase the temperature by taking not more than one hour.

Desirably, a time required for the acetylation reaction (which may hereinafter be referred to as an acetylation time) is 150 to 280 minutes. The acetylation time herein refers to a period of time from when the raw material cellulose is fed into the reaction system and starts reacting with the acetic anhydride to when a neutralizer is fed into the reaction system.

In the saponifying and ripening step (iii) of partially neutralizing the sulfuric acid catalyst and ripening the acetylated cellulose in the presence of the sulfuric acid catalyst (or the remaining sulfuric acid), since sulfuric acid is previously combined with the cellulose to be a sulfate ester through the acetylation reaction, after the acetylation reaction is ended, the sulfate ester is removed by saponification so as to improve thermal stability. In the saponifying and ripening, a neutralizer such as water, dilute acetic acid, or an aqueous solution of magnesium acetate is added to stop the acetylation reaction. The water can be added such that the water reacts with acetic anhydride present in the cellulose acetate-containing reaction mixture to produce acetic acid, and such that, after the saponifying and ripening step, the water content in the cellulose acetate-containing reaction mixture is 5 to 70 mol % with respect to the acetic acid. If the water content in the reaction mixture is less than 5 mol % with respect to the acetic acid, the saponifying reaction does not proceed but depolymerization proceeds. As a result, the viscosity of the cellulose acetate becomes low. If the water content in the reaction mixture is more than 70 mol % with respect to the acetic acid, a cellulose ester (cellulose triacetate) resulting from the acetylation reaction becomes deposited and the deposited cellulose ester is not subjected to the saponifying and ripening reaction. For this reason, the saponifying reaction of the deposited cellulose ester does not proceed.

The dilute acetic acid herein refers to 1 to 50% by weight of an aqueous solution of acetic acid. Also, the aqueous solution of magnesium acetate herein contains preferably 5 to 30% by weight of magnesium acetate.

It should be noted that the cellulose acetate-containing reaction mixture herein may refer to any of the cellulose acetate-containing mixtures in the respective steps for obtaining the cellulose acetate powder.

If the sulfate ion concentration in the cellulose acetate-containing reaction mixture is high, the sulfate ester cannot be removed efficiently. Therefore, it is preferable to add an aqueous solution of an alkaline earth metal acetate such as magnesium acetate or an acetic acid-water mixture solution, such that an insoluble sulfate is formed, and thereby the sulfate ion concentration is lowered. It is preferable to adjust the amount of sulfate ions in the cellulose acetate-containing reaction mixture to be 1 to 6 parts by weight with respect to 100 parts by weight of the cellulose acetate (in terms of cellulose). It should be noted that, for example, by adding an acetic acid-water mixture solution containing magnesium acetate to the cellulose acetate-containing reaction mixture, the acetylation reaction can be stopped, and at the same time, the weight ratio of sulfate ions with respect to 100 parts by weight of the cellulose acetate (in terms of cellulose) can be lowered.

A time required for the saponifying and ripening (which may hereinafter be referred to as a ripening time) is not particularly limited. In the case of adjusting the acetylation, degree to 53 to 56%, the ripening time is, for example, 10 to 240 minutes. The ripening time herein refers to a period of time from when the feeding of the neutralizer is started to when the saponifying reaction is stopped.

The saponifying and ripening are performed by keeping a ripening temperature of preferably 50 to 100° C. or particularly preferably 70 to 90° C. for 20 to 120 minutes. The ripening temperature herein refers to the temperature in the reaction system during the ripening time.

In the saponifying and ripening step, the reaction heat in the reaction between water and acetic anhydride can be utilized to keep the temperature of the entire reaction system uniform at a suitable temperature. As a result, cellulose acetate with an excessively high acetylation degree or excessively low acetylation degree is prevented from being produced.

In the purifying and drying step (iv), the purification can be performed by: mixing the cellulose acetate-containing mixture with a precipitant such as water, dilute acetic acid, or an aqueous solution of magnesium acetate; separating the resulting cellulose acetate (i.e., a precipitate) to obtain the precipitate; and removing, for example, free metal components and sulfuric acid components from the precipitate by washing with water. The precipitant used herein to obtain the cellulose acetate precipitate is preferably water or dilute acetic acid. The reason for this is that the sulfate in the cellulose acetate-containing reaction mixture is dissolved in such a precipitant, and thereby the sulfate can be readily removed from the cellulose acetate powder obtained as the precipitate.

In particular, after the ripening reaction (after full neutralization), in addition to the washing with water, an alkali metal compound and/or an alkaline earth metal compound, particularly a calcium compound such as calcium hydroxide, may be added as a stabilizer as necessary for the purpose of improving the thermal stability of the cellulose acetate. Moreover, a stabilizer may be used in the washing with water.

Japanese Laid-Open Patent Application Publication No. 2013-049867 discloses injecting a reaction mixture into dilute acetic acid to cause precipitation of cellulose triacetate. However, with this method, only a powder with large particle diameters can be produced. U.K. Patent Application Publication No. 532949 discloses mixing a cellulose acetate solution with a precipitating liquid with low precipitating power (40% acetic acid solution) and then mixing the mixture with a precipitating liquid with high precipitating power (18% acetic acid solution), thereby causing multiple-stage precipitation of cellulose acetate. However, with this method, only a powder with a small cumulative pore volume can be produced. Thus, with neither of these precipitation methods, a powder satisfying the particle size, the cumulative pore volume, and the angle of repose of the present disclosure can be obtained.

In the present disclosure, when the cellulose acetate-containing reaction mixture is mixed with the precipitant to cause precipitation of cellulose acetate, it is preferable that the precipitation point of the cellulose acetate be exceeded rapidly. For example, in the case of adding a precipitant to the cellulose acetate-containing reaction mixture, the precipitation point of the cellulose acetate can be exceeded rapidly in any of the following manners: (1) add the precipitant in an amount sufficient to exceed the precipitation point of the cellulose acetate at one time; (2) add the precipitant in an amount sufficient to exceed the precipitation point of the cellulose acetate, and then further add the precipitant, thereby adding the precipitant twice; and (3) add the precipitant in an amount insufficient to exceed the precipitation point of the cellulose acetate, and then further add the precipitant in a large amount, thereby adding the precipitant twice.

A specific way of mixing the cellulose acetate-containing reaction mixture with the precipitant is, for example, stirring the cellulose acetate-containing reaction mixture and the precipitant together by using a professional-use mixer, or adding the precipitant to the cellulose acetate-containing reaction mixture and kneading them together by using a twin-screw kneader. For example, in the case of adopting stirring the cellulose acetate-containing reaction mixture and the precipitant together by using a professional-use mixer, the cellulose acetate-containing reaction mixture and the precipitant in an amount necessary for precipitating the cellulose acetate are mixed together at one time, and the mixture is stirred. In the case of adopting kneading the precipitant and the cellulose acetate-containing reaction mixture together by using a twin-screw kneader, the precipitant may be added to the cellulose acetate-containing reaction mixture several times separately. In this case, preferably, immediately before exceeding the precipitation point, the precipitant in an amount 0.5 to 2 times as large as the amount of the cellulose acetate-containing reaction mixture is added to the cellulose acetate-containing reaction mixture at one time.

It is preferable to adopt stirring the cellulose acetate-containing reaction mixture and the precipitant together by using a professional-use mixer, because in this way, the precipitation point can be exceeded more rapidly and the cellulose acetate powder with a greater cumulative pore volume can be readily obtained.

In the purifying and drying step (iv), the drying can be performed by a known method, and the drying method to be adopted is not particularly limited. For example, the drying can be performed under air-blowing conditions or under reduced pressure. The drying method to be adopted may be hot-air drying, for example.

In the grinding step (v), the method of grinding the cellulose acetate precipitate is not particularly limited, so long as the proportion of particles having a particle diameter of not less than 500 μm in the cellulose acetate powder can be adjusted to be not higher than 40%, and the angle of repose of the cellulose acetate powder can be adjusted to be not less than 51°. The grinding can be performed by using a commonly used grinder, for example, a sample mill, hammer mill, turbo mill, atomizer, cutter mill, bead mill, ball mill, roll mill, jet mill, or a pin mill. Alternatively, the grinding can be performed by freezing and grinding, dry grinding at ordinary temperature, or wet grinding. Among these, the use of a hammer mill or turbo mill is preferable since their grinding capacity is excellent.

In addition, for example, in the case of using a mill with a screen, the screen size is preferably not greater than 2.0 mm, more preferably not greater than 1.0 mm, and even more preferably not greater than 0.5 mm. If the screen size is greater than 2.0 mm, it is difficult to obtain the powder that satisfies both the particle size and the angle of repose of the present disclosure.

(Mixing the Plasticizer)

In the case of mixing a plasticizer into the cellulose acetate powder of the present disclosure, the cellulose acetate powder can be mixed with the plasticizer by using a mixing machine, such as a planetary mill, Henschel mixer, vibration mill, or a ball mill. It is preferable to use a Henschel mixer since uniform dispersive mixing can be performed with it within a short period of time. The degree of mixing is not particularly limited. However, for example, in the case of using a Henschel mixer, the mixing is performed preferably for a period of ten minutes to one hour.

After the cellulose acetate powder is mixed with the plasticizer, the mixture can be subjected to drying. One example of the method of drying is to dry the mixture by leaving it to stand at 50 to 105° C. for 1 to 48 hours.

When mixing the cellulose acetate powder with the plasticizer, for example, a colorant, a heat-resistant stabilizer, an antioxidant, and/or an ultraviolet absorber can be added thereto in accordance with the application and specifications of the formed article.

[Cellulose Acetate Formed Article]

A cellulose acetate formed article can be produced by using the cellulose acetate powder with the plasticizer adsorbed thereto. The cellulose acetate powder with the plasticizer adsorbed thereto is prepared by mixing the cellulose acetate powder with the plasticizer and drying the mixture. The production of the formed article is performed, for example, by a method in which the cellulose acetate powder with the plasticizer adsorbed thereto is kneaded by an extruder such as a single screw extruder or twin screw extruder and prepared into pellets, or by a method in which the cellulose acetate powder with the plasticizer adsorbed thereto is melt-kneaded by a kneader such as a heating roller or Banbury mixer and thus prepared.

After the pellets are prepared, for example, the pellets may be melted again by using a single or twin screw extruder to which a T-die is attached and then formed into a film or the like.

The cellulose acetate powder of the present disclosure can be formed into various formed articles by, for example, injection molding, extrusion forming, vacuum forming, profile molding, foam molding, injection press molding, press forming, blow molding, or gas injection molding.

The cellulose acetate powder and the formed article made of the cellulose acetate powder of the present disclosure are widely applicable to, for example, sheets, films, pipes, bars, materials for seals, decorative materials, eyeglass frames, tool handles, tableware handles, toys, fibers, sundries, and so forth in the field of OA equipment and home appliances, electrical and electronic field, field of communication devices, sanitary field, field of transport vehicles such as automobiles, housing-related fields such as the furniture field and building materials field, sundries field, etc.

EXAMPLES

Hereinafter, the present invention is specifically described with reference to Examples, but the technical scope of the present invention is not limited by these Examples.

Physical properties indicated in Examples below were evaluated by methods described below.

<Acetylation Degree>

The acetylation degree was determined by an acetylation degree measuring method according to ASTM-D-817-91 (which prescribes test methods of testing cellulose acetate, etc.).

Dry cellulose acetate in an amount of 1.9 g was precisely weighed and dissolved in 150 ml of a mixed solvent of acetone and dimethyl sulfoxide (volume ratio 4:1). Then, 30 ml of a 1N-sodium hydroxide aqueous solution was added thereto, and the resulting mixture was saponified at 25° C. for two hours. Phenolphthalein was added as an indicator, and the excess sodium hydroxide was titrated with 1N-sulfuric acid (concentration factor: F). Also, a blank test was performed in the same manner as above, and the acetylation degree was calculated in accordance with an equation shown below.

$$\text{Acetylation degree (\%)} = [6.5 \times (B-A) \times F]/W$$

(In the equation, A is the titer (ml) of 1N-sulfuric acid used for the sample; B is the titer (ml) of 1N-sulfuric acid in the blank test; F is the concentration factor of 1N-sulfuric acid; and W is the weight of the sample.)

<6% Viscosity>

The 6% viscosity of the cellulose acetate was measured by a method described below.

In an Erlenmeyer flask, 3.00 g of a dry sample and 39.90 g of 95% aqueous solution of acetone were placed. The flask was sealed and stirred for about 1.5 hours. Then, the sample was completely dissolved by shaking the flask for about one hour with a rotary shaker. The resulting 6 wt/vol % solution was transferred into a predetermined Ostwald viscometer up to its marked line, and the temperature was controlled to be 25±1° C. for about 15 minutes. The flow time required to pass between time-marker lines was measured, and the 6% viscosity was calculated by using an equation (1) shown below.

$$6\% \text{ viscosity(mPa·s)} = \text{flow time(s)} \times \text{viscometer coefficient} \quad (1)$$

The viscometer coefficient was determined in the following manner: the flow time of a standard solution for viscometer calibration (manufactured by Showa Shell Sekiyu K.K., trade name "JS-200" (complying with JIS Z 8809)) was measured in the same manner as described above; and the viscometer coefficient was calculated by using an equation (2) shown below. Viscometer Coefficient={the absolute viscosity of the standard solution (mPa·s)×the density of the solution (0.827 g/cm$^3$)}/{the density of the standard solution (g/cm$^3$)×the flow time of the standard solution in seconds (s)} (2)

<Particle Size>

Sieving of a cellulose acetate powder was performed by using sieves specified by JIS Z 8801. At the time, the smallest sieve opening size through which the particles of the cellulose acetate powder did not pass was defined as the particle diameter. Thus, the particle diameter was determined by using the sieves specified by JIS Z 8801.

The proportion of particles having a particle diameter of not less than 500 μm in the cellulose acetate powder was determined in the following manner. Sieves with opening sizes of 4,000 μm, 1,700 μm, 1,000 μm, 840 μm, 500 μm, 300 μm, 150 μm, and 50 μm, and a receiver pan were prepared. First, the sieve with an opening size of 4,000 μm was attached to a Ro-tap machine (manufactured by SIEVE FACTORY IIDA CO., LTD.; a tapping rate of 156 times/min and a rolling rate of 290 times/min), and 100 g of the cellulose acetate powder was shaken with the Ro-tap machine for five minutes. Then, the sample on the receiver pan was put into the sieve with an opening size of 1,700 μm and sieved in the same manner, and thereafter, sequentially subjected to sieving by the sieves with opening sizes of 1,000 μm, 840 μm, and 500 μm. The proportion of the sum of the weights of the cellulose acetate powder on the sieves with opening sizes of 4,000 μm, 1,700 μm, 1,000 μm, 840 μm, and 500 μm to the total powder weight (cellulose acetate powder 100 g) was defined as the proportion of particles having a particle diameter of not less than 500 μm.

<Cumulative Pore Volume>

The cumulative pore volume was measured by mercury intrusion porosimetry with the use of a mercury porosimeter (PoreMaster 60 manufactured by Quantachrome Instruments).

<BET Specific Surface Area>

Specific surface area measuring method: BET multipoint method was used.

Measurement apparatus: a high-speed specific surface area/pore diameter distribution measurement apparatus NOVA-1200 (manufactured by Yuasa-Ionics) was used.

Pretreatment conditions: a sample was placed in a measurement cell and deaerated at 60° C. (under vacuum) for ten minutes.

Adsorption gas: nitrogen gas was used.

Cell size: a small pellet cell of 1.80 cm$^3$ (with a stem outer diameter of 9 mm) was used.

Measurement points: three points on the adsorption side at 0.1, 0.2, and 0.3.

Analysis Items: one-point BET, multi-point BET, and Langmuir specific surface area.

Number of times of measurement: measurement was performed three times with different samples, and a specific surface area shown in Table 1 is an average value in the measurement performed three times.

<Hopper Fluidity>

Hopper fluidity was evaluated based on a powder fluidity index in accordance with criteria indicated below.

Hopper fluidity was evaluated as "Good" when the powder fluidity index was in the range of 40 to 100.

Hopper fluidity was evaluated as "Poor" when the powder fluidity index was in the range of 0 to 39.

<Powder Fluidity Index>

An index was obtained from each of measurement values of the angle of repose, compressibility, spatula angle, and uniformity. These indexes were summed up, and the resulting numerical value was defined as the powder fluidity index of cellulose acetate flakes or powder. The indexes were obtained from the respective measurement values in accordance with a powder fluidity index table (in "Powder Technology Pocket Book", Tsunemi Hayashi).

<Angle of Repose>

The angle of repose of the cellulose acetate flakes or powder was measured by using a powder tester (manufactured by Hosokawa Micron Corporation; trade name "Powder Tester TYPE PT-E"). More specifically, flakes or a powder (in an amount of about 100 g) with no plasticizer added thereto was placed on a sieve, and the sieve was shaken. As a result, the powder passed through a funnel and fell on a bottom dedicated table that was set horizontally, and thus formed into a pile. Then, the angle formed by the horizontal plane and a straight line connecting between the peak of the pile and the bottom of the pile was measured.

<Compressibility>

The compressibility of the cellulose acetate flakes or powder was measured by using a powder tester (manufactured by Hosokawa Micron Corporation; trade name "Powder Tester TYPE PT-E"). More specifically, the powder was gently poured into a dedicated cup by using a dedicated scoop. After the dedicated cup was filled with the powder until the powder overflowed from the opening of the cup, the powder surface was leveled by an accompanying blade, and the weight of the powder was measured together with the cup. Then, from the value of the measured weight, the weight of the cup measured in advance was subtracted, and thereby the weight of the powder was determined. The weight of the powder was divided by the inner volume of the cup (100 ml), and the resulting value was defined as a loose apparent density. Next, a cap was additionally attached to the dedicated cup, which was then set on the tapping holder of the powder tester. Thereafter, the cup with the cap attached thereto was filled with the powder, and then a cap cover was attached to the top of the cap. The cup with the cap and cap cover attached thereto was subjected to tapping for 180 seconds. After the tapping was ended, the cap and the cap cover were removed, and the powder surface in the dedicated cup was leveled by the accompanying blade. The weight of the powder was measured together with the cup. Then, from the value of the measured weight, the weight of the cup measured in advance was subtracted, and thereby the weight of the powder was determined. The weight of the powder was divided by the inner volume of the cup (100 ml), and the resulting value was defined as a tight apparent density. The tight apparent density and the loose apparent density obtained as above were used in calculation of the compressibility (%) with an equation shown below.

(Compressibility)={(tight apparent density)−(loose apparent density)}/(tight apparent density)×100

<Spatula Angle>

The spatula angle was evaluated by using a powder tester (manufactured by Hosokawa Micron Corporation; trade name "Powder Tester TYPE PT-E"). (1) A sample was put on a spatula placed on a dedicated tray, such that the sample was piled up on the spatula; thereafter, a lifting/lowering stand with the dedicated tray placed thereon was lowered; and by using an accompanying protractor stand, the inclination angle of a ridge line of the pile of the sample on the spatula was measured. (2) An accompanying weight of a spatula assembly was lifted to the upper end of its pole and then dropped to give an impact shock to the spatula only once; and then the inclination angle of the sample on the spatula was measured. The average of the measurement values in (1) and (2) was defined as the spatula angle.

<Uniformity>

Particle size distribution measurement was performed, and a value resulting from dividing a 60% under-sieve particle diameter by a 10% under-sieve particle diameter was defined as uniformity. In the particle size distribution measurement, a particle size distribution was created in the same manner as the above-described particle size distribution creation, and a sieve opening size at the 60% cumulative weight percentage and a sieve opening size at the 10% cumulative weight percentage were defined as the 60% under-sieve particle diameter and the 10% under-sieve particle diameter, respectively.

Physical properties of the cellulose acetate formed article produced by using the cellulose acetate flakes or powder were evaluated by a method described below.

<Spotty Patches on Film>

With respect to 100 parts by weight of the cellulose acetate flakes or powder, 35 parts by weight of DEP (diethyl phthalate) was added, and the mixture was sufficiently mixed by a Henschel mixer. The resulting compound was dried at 90° C. for eight hours. The dried compound was formed into pellets at a temperature of 230° C. by using a 30 m/mΦ twin screw extruder. By using a single screw extruder I with a T-die having a width of 150 mm attached thereto (manufactured by Research Laboratory of Plastics Technology Co., Ltd., model number GT-25A), these pellets were melted again at 230° C., and thereby a film with a thickness of 200 μm was formed. The number of spotty patches per 210 cm² (length and width: 70 mm×300 mm) of the formed film was visually evaluated. The evaluation was made in accordance with the criteria indicated below.

It was evaluated as "Very Good" when the number of spotty patches was not more than 25.

It was evaluated as "Good" when the number of spotty patches was not less than 26 and not more than 60.

It was evaluated as "Poor" when the number of spotty patches was not less than 61.

Comparative Example 1

Hardwood pre-hydrolyzed kraft pulp with an a cellulose content of 98.4 wt % was disintegrated into a cotton-like form by a disc refiner, and 26.8 parts by weight of acetic acid was sprayed on 100 parts by weight of the disintegrated pulp (with a water content of 8%), which was then mixed well. Thereafter, the pulp was left to stand for 60 hours for activation as pretreatment (the activating step).

The activated pulp was added to a mixture of 323 parts by weight of acetic acid, 245 parts by weight of acetic anhydride, and 13.1 parts by weight of sulfuric acid. The mixture had been cooled down to 5° C. in advance. The temperature was controlled such that it was increased from 5° C. to the highest temperature of 40° C. by taking 40 minutes, and the pulp was subjected to acetylation for 90 minutes since the addition of the pulp to the mixture. A neutralizer (24% aqueous solution of magnesium acetate) was added by taking three minutes such that the amount of sulfuric acid (the amount of ripening sulfuric acid) was adjusted to 2.5 parts by weight. The temperature of the reaction bath was further increased to 75° C., and then water was added thereto such that the concentration of water (ripening water) in the reaction bath was adjusted to 52 mol %. It should be noted that the concentration of ripening water was determined by multiplying the molar ratio of water to acetic acid in the reaction bath by 100, and was expressed in mol %. Thereafter, ripening was performed at 85° C. for 100 minutes, and then the ripening was stopped by neutralizing sulfuric acid with magnesium acetate. In this manner, a cellulose acetate-containing reaction mixture was obtained.

1200 parts by weight of dilute acetic acid (10 wt %) and 400 parts by weight of the cellulose acetate-containing reaction mixture were added into a professional-use mixer (manufactured by Panasonic Corporation, model number MX-152SP-W). The mixture was stirred by the mixer for four seconds, and cellulose acetate was precipitated. The precipitated cellulose acetate was washed with water, immersed in a dilute aqueous solution of calcium hydroxide (20 ppm), and thereafter filtered and dried. In this manner, cellulose acetate flakes were obtained. The acetylation degree, 6% viscosity, particle size, cumulative pore volume, BET specific surface area, angle of repose, and the hopper fluidity of the obtained cellulose acetate flakes were measured. The obtained cellulose acetate flakes were formed into a film, which was evaluated in terms of spotty patches formed thereon. The evaluation result is shown in Table 1.

Comparative Example 2

The cellulose acetate flakes obtained in Comparative Example 1 were ground by using a Making grinder (manufactured by MAKINO MFG CO., LTD., model number DD-2-3.7). The grinding was performed under the following conditions: the rotation speed was 2450 rpm and the screen size φ was 5.0 mm.

The acetylation degree, 6% viscosity, particle size, cumulative pore volume, BET specific surface area, angle of repose, and the hopper fluidity of the obtained cellulose acetate powder were measured. The obtained cellulose acetate powder was formed into a film, which was evaluated in terms of spotty patches formed thereon. The evaluation result is shown in Table 1.

Comparative Example 3

Dilute acetic acid (10 wt %) was blended into the cellulose acetate-containing reaction mixture obtained in Comparative Example 1 by kneading using a twin-screw kneader, and cellulose acetate was precipitated by kneading precipitation. At the time, the dilute acetic acid was blended into the cellulose acetate-containing reaction mixture three times separately by kneading. The dilute acetic acid (10 wt %) in an amount (in terms of weight ratio) 0.4 times as large as the amount of the cellulose acetate-containing reaction mixture was blended into the cellulose acetate-containing reaction mixture by kneading at the first time. After the reaction mixture became uniform, the dilute acetic acid (10 wt %) in an amount (in terms of weight ratio) 0.5 times as large as the amount of the cellulose acetate-containing reaction mixture was added to the cellulose acetate-containing reaction mixture at the second time, and the dilute acetic acid (10 wt %) in an amount (in terms of weight ratio) 0.6 times as large as the amount of the cellulose acetate-containing reaction mixture was added to the cellulose acetate-containing reaction mixture at the third time. Thus, in total, the dilute acetic acid (10 wt %) in an amount (in terms of weight ratio) 1.5 times as large as the amount of the cellulose acetate-containing reaction mixture was added to the cellulose acetate-containing reaction mixture. Precipitation of cellulose acetate occurred when the dilute acetic acid (10 wt %) in an amount (in terms of weight ratio) 0.6 times as large as the amount of the cellulose acetate-containing reaction mixture was added to the cellulose acetate-containing reaction mixture at the third time.

The precipitated cellulose acetate was washed with water, immersed in a dilute aqueous solution of calcium hydroxide (20 ppm), and thereafter filtered and dried. In this manner, cellulose acetate flakes were obtained.

The obtained cellulose acetate flakes were ground by using the same grinder as that used in Comparative Example 2. The grinding was performed under the following conditions: the rotation speed was 2450 rpm and the screen size $\varphi$ was 0.5 mm.

The acetylation degree, 6% viscosity, particle size, cumulative pore volume, BET specific surface area, angle of repose, and the hopper fluidity of the obtained cellulose acetate powder were measured. The obtained cellulose acetate powder was formed into a film, which was evaluated in terms of spotty patches formed thereon. The evaluation result is shown in Table 1.

Comparative Example 4

Dilute acetic acid (10 wt %) was blended into the cellulose acetate-containing reaction mixture obtained in Comparative Example 1 by kneading using a twin-screw kneader, and cellulose acetate was precipitated by kneading precipitation. At the time, the dilute acetic acid was blended into the cellulose acetate-containing reaction mixture three times separately by kneading. The dilute acetic acid in an amount (in terms of weight ratio) 0.5 times as large as the amount of the cellulose acetate-containing reaction mixture was added to the cellulose acetate-containing reaction mixture at the first time. The dilute acetic acid in an amount (in terms of weight ratio) 1.2 times as large as the amount of the cellulose acetate-containing reaction mixture was added to the cellulose acetate-containing reaction mixture at the second time, and the dilute acetic acid in an amount (in terms of weight ratio) 0.6 times as large as the amount of the cellulose acetate-containing reaction mixture was added to the cellulose acetate-containing reaction mixture at the third time. Thus, in total, the dilute acetic acid in an amount (in terms of weight ratio) 2.3 times as large as the amount of the cellulose acetate-containing reaction mixture was added to the cellulose acetate-containing reaction mixture. Cellulose acetate was gradually deposited and precipitated. The precipitated cellulose acetate was washed with water, immersed in a dilute aqueous solution of calcium hydroxide (20 ppm), and thereafter filtered and dried. In this manner, cellulose acetate flakes were obtained.

The obtained cellulose acetate flakes were ground by using the same grinder as that used in Comparative Example 2. The grinding was performed under the following conditions: the rotation speed was 2450 rpm and the screen size y was 0.5 mm.

The acetylation degree, 6% viscosity, particle size, cumulative pore volume, BET specific surface area, angle of repose, and the hopper fluidity of the obtained cellulose acetate powder were measured. The obtained cellulose acetate powder was formed into a film, which was evaluated in terms of spotty patches formed thereon. The evaluation result is shown in Table 1.

Comparative Example 5

Comparative Example 5 was the same as Comparative Example 3 except that, in Comparative Example 5, the cellulose acetate flakes obtained in the same manner as in Comparative Example 3 were not ground.

The acetylation degree, 6% viscosity, particle size, cumulative pore volume, BET specific surface area, angle of repose, and the hopper fluidity of the obtained cellulose acetate flakes were measured. The obtained cellulose acetate powder was formed into a film, which was evaluated in terms of spotty patches formed thereon. The evaluation result is shown in Table 1.

Comparative Example 6

In Comparative Example 6, a cellulose acetate-containing reaction mixture was obtained in the same manner as in Comparative Example 1 except that, in Comparative Example 6, the concentration of water (ripening water) in the reaction bath was adjusted to 44 mol % and the ripening time was changed into 130 minutes.

Dilute acetic acid (10 wt %) was blended into the obtained cellulose acetate-containing reaction mixture by kneading using a twin-screw kneader, and cellulose acetate was precipitated by kneading precipitation. At the time, the dilute acetic acid was blended into the cellulose acetate-containing reaction mixture several times separately by kneading. In comparison with the respective times of addition of the dilute acetic acid in Comparative Example 3, the dilute acetic acid was not added to the cellulose acetate-containing reaction mixture at the first time; the dilute acetic acid in an amount (in terms of weight ratio) 1.7 times as large as the amount of the cellulose acetate-containing reaction mixture was added to the cellulose acetate-containing reaction mixture at the second time; and the dilute acetic acid in an amount (in terms of weight ratio) 0.6 times as large as the amount of the cellulose acetate-containing reaction mixture was added to the cellulose acetate-containing reaction mixture at the third time. Thus, in total, the dilute acetic acid in an amount (in terms of weight ratio) 2.3 times as large as the amount of the cellulose acetate-containing reaction mixture was added to the cellulose acetate-containing reaction mixture. Precipitation of cellulose acetate occurred when the dilute acetic acid (10 wt %) in an amount (in terms of weight ratio) 1.7 times as large as the amount of the cellulose acetate-containing reaction mixture was added to the cellulose acetate-containing reaction mixture.

The precipitated cellulose acetate was washed with water, immersed in a dilute aqueous solution of calcium hydroxide (20 ppm), and thereafter filtered and dried. In this manner, cellulose acetate flakes were obtained.

The acetylation degree, 6% viscosity, particle size, cumulative pore volume, BET specific surface area, angle of repose, and the hopper fluidity of the obtained cellulose acetate flakes were measured. The obtained cellulose acetate powder was formed into a film, which was evaluated in terms of spotty patches formed thereon. The evaluation result is shown in Table 1.

Example 1

In Example 1, the cellulose acetate flakes obtained in Comparative Example 1 were ground by using the same grinder as that used in Comparative Example 2. The grinding was performed under the following conditions: the rotation speed was 2450 rpm and the screen size φ was 0.5 mm.

The acetylation degree, 6% viscosity, particle size, cumulative pore volume, BET specific surface area, angle of repose, and the hopper fluidity of the obtained cellulose acetate powder were measured. The obtained cellulose acetate powder was formed into a film, which was evaluated in terms of spotty patches formed thereon. The evaluation result is shown in Table 1.

Example 2

In Example 2, the cellulose acetate flakes obtained in Comparative Example 1 were ground by using the same grinder as that used in Comparative Example 2. The grinding was performed under the following conditions: the rotation speed was 2450 rpm and the screen size φ was 1.0 mm.

The acetylation degree, 6% viscosity, particle size, cumulative pore volume, BET specific surface area, angle of repose, and the hopper fluidity of the obtained cellulose acetate powder were measured. The obtained cellulose acetate powder was formed into a film, which was evaluated in terms of spotty patches formed thereon. The evaluation result is shown in Table 1.

Example 3

In Example 3, the cellulose acetate flakes obtained in Comparative Example 1 were ground by using the same grinder as that used in Comparative Example 2. The grinding was performed under the following conditions: the rotation speed was 2450 rpm and the screen size φ was 2.0 mm.

The acetylation degree, 6% viscosity, particle size, cumulative pore volume, BET specific surface area, angle of repose, and the hopper fluidity of the obtained cellulose acetate powder were measured. The obtained cellulose acetate powder was formed into a film, which was evaluated in terms of spotty patches formed thereon. The evaluation result is shown in Table 1.

Example 4

In Example 4, cellulose acetate flakes were obtained in the same manner as in Comparative Example 1 except that, in Example 4, the concentration of water (ripening water) in the reaction bath was adjusted to 54 mol % and the ripening time was changed into 85 minutes. The obtained cellulose acetate flakes were ground by using the same grinder as that used in Comparative Example 2. The grinding was performed under the following conditions: the rotation speed was 2450 rpm and the screen size φ was 0.5 mm.

The acetylation degree, 6% viscosity, particle size, cumulative pore volume, BET specific surface area, angle of repose, and the hopper fluidity of the obtained cellulose acetate powder were measured. The obtained cellulose acetate powder was formed into a film, which was evaluated in terms of spotty patches formed thereon. The evaluation result is shown in Table 1.

Example 5

In Example 5, cellulose acetate flakes were obtained in the same manner as in Comparative Example 1 except that, in Example 5, the concentration of water (ripening water) in the reaction bath was adjusted to 44 mol % and the ripening time was changed into 130 minutes. The obtained cellulose acetate flakes were ground by using the same grinder as that used in Comparative Example 2. The grinding was performed under the following conditions: the rotation speed was 2450 rpm and the screen size φ was 0.5 mm.

The acetylation degree, 6% viscosity, particle size, cumulative pore volume, BET specific surface area, angle of repose, and the hopper fluidity of the obtained cellulose acetate powder were measured. The obtained cellulose acetate powder was formed into a film, which was evaluated in terms of spotty patches formed thereon. The evaluation result is shown in Table 1.

Example 6

Dilute acetic acid (10 wt %) was blended into the cellulose acetate-containing reaction mixture obtained in Example 5 by kneading using a twin-screw kneader, and cellulose acetate was precipitated by kneading precipitation. At the time, the dilute acetic acid was blended into the cellulose acetate-containing reaction mixture several times separately by kneading. In comparison with the respective times of addition of the dilute acetic acid in Comparative Example 3, the dilute acetic acid was not added to the cellulose acetate-containing reaction mixture at the first time; the dilute acetic acid in an amount (in terms of weight ratio) 1.7 times as large as the amount of the cellulose acetate-containing reaction mixture was added to the cellulose acetate-containing reaction mixture at the second time; and the dilute acetic acid in an amount (in terms of weight ratio) 0.6 times as large as the amount of the cellulose acetate-containing reaction mixture was added to the cellulose acetate-containing reaction mixture at the third time. Thus, in total, the dilute acetic acid in an amount (in terms of weight ratio) 2.3 times as large as the amount of the cellulose acetate-containing reaction mixture was added to the cellulose acetate-containing reaction mixture. Precipitation of cellulose acetate occurred when the dilute acetic acid (10 wt %) in an amount (in terms of weight ratio) 1.7 times as large as the amount of the cellulose acetate-containing reaction mixture was added to the cellulose acetate-containing reaction mixture.

The precipitated cellulose acetate was washed with water, immersed in a dilute aqueous solution of calcium hydroxide (20 ppm), and thereafter filtered and dried. In this manner, cellulose acetate flakes were obtained.

The obtained cellulose acetate flakes were ground by using the same grinder as that used in Comparative Example 2. The grinding was performed under the following conditions: the rotation speed was 2450 rpm and the screen size φ was 0.5 mm.

The acetylation degree, 6% viscosity, particle size, cumulative pore volume, BET specific surface area, angle of repose, and the hopper fluidity of the obtained cellulose acetate powder were measured. The obtained cellulose acetate powder was formed into a film, which was evaluated in terms of spotty patches formed thereon. The evaluation result is shown in Table 1.

TABLE 1

|  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| Precipitation Method | Mixer | Mixer | Blending by kneading | Blending by kneading | Blending by kneading | Blending by kneading |
| State of Grinding | Unground | Ground | Ground | Ground | Unground | Unground |
| Screen Size φ [mm] | — | 5.0 | 0.5 | 0.5 | — | — |
| Acetylation Degree [%] | 53.8 | 53.8 | 53.8 | 53.8 | 53.8 | 55.4 |
| 6% Viscosity [mPa·s] | 87 | 87 | 87 | 87 | 87 | 74 |
| Particle Size (Proportion [%] of particles having a particle diameter of not less than 500 μm) | 99.6 | 50.0 | 2.0 | 2.0 | 99.2 | 98.8 |
| Cumulative Pore Volume [ml/g] | 0.590 | 0.590 | 0.150 | 0.192 | 0.192 | 0.319 |
| BET Specific Surface Area [m²/g] | 3.89 | 4.45 | 1.91 | 2.87 | 1.53 | 2.50 |
| Angle of Repose [°] | 60.5 | 54.7 | 55.0 | 51.9 | 66.0 | 64.3 |
| Hopper Fluidity | Poor | Poor | Poor | Poor | Poor | Poor |
| Spotty patches on Film | Poor | Poor | Poor | Poor | Poor | Poor |

|  | Ex. 1 | Ex. 2 | Ex. 3 | Ex. 4 | Ex. 5 | Ex. 6 |
|---|---|---|---|---|---|---|
| Precipitation Method | Mixer | Mixer | Mixer | Mixer | Mixer | Blending by kneading |
| State of Grinding | Ground | Ground | Ground | Ground | Ground | Ground |
| Screen Size φ [mm] | 0.5 | 1.0 | 2.0 | 0.5 | 0.5 | 0.5 |
| Acetylation Degree [%] | 53.8 | 53.8 | 53.8 | 55.4 | 54.5 | 55.4 |
| 6% Viscosity [mPa·s] | 87 | 87 | 87 | 112 | 74 | 74 |
| Particle Size (Proportion [%] of particles having a particle diameter of not less than 500 μm) | 1.5 | 11.3 | 18.6 | 1.2 | 1.8 | 1.2 |
| Cumulative Pore Volume [ml/g] | 0.590 | 0.590 | 0.590 | 0.575 | 0.559 | 0.319 |
| BET Specific Surface Area [m²/g] | 5.56 | 5.32 | 5.19 | 5.72 | 5.47 | 4.06 |
| Angle of Repose [°] | 47.2 | 48.1 | 49.3 | 46.8 | 47.5 | 50.5 |
| Hopper Fluidity | Good | Good | Good | Good | Good | Good |
| Spotty patches on Film | Very Good | Good | Good | Very Good | Very Good | Good |

The invention claimed is:

1. A cellulose acetate powder comprising cellulose acetate having an acetylation degree of 53 to 56% and a 6% viscosity of 30 to 200 mPa·s, wherein:
   a cumulative pore volume is not less than 0.200 ml/g and not more than 1.500 ml/g;
   a proportion of particles having a particle diameter of not less than 500 μm is not higher than 10%;
   an angle of repose is not greater than 49°; and
   a BET specific surface area is not less than 5.19 m²/g and not greater than 5.72 m²/g.

2. The cellulose acetate powder according to claim 1, wherein
   20 to 40 parts by weight of a plasticizer is adsorbed to 100 parts by weight of the cellulose acetate powder.

3. The cellulose acetate powder according to claim 2, wherein
   the plasticizer is diethyl phthalate, triacetin, or triphenyl phosphate.

4. A method of producing a formed article, the method comprising:
   forming the cellulose acetate powder according to claim 3 into a formed article.

5. A method of producing a formed article, the method comprising:
   forming the cellulose acetate powder according to claim 2 into a formed article.

6. A method of producing a plasticizer-adsorbed cellulose acetate powder, the method comprising:
   mixing 20 to 40 parts by weight of a plasticizer into 100 parts by weight of the cellulose acetate powder according to claim 1.

7. The cellulose acetate powder according to claim 1, wherein
   the BET specific surface area is not less than 5.47 m²/g and not greater than 5.72 m²/g.

8. The cellulose acetate powder according to claim 1, wherein the cumulative pore volume is not less than 0.200 ml/g and not more than 1.500 ml/g in accordance with a mercury intrusion porosimetry.

* * * * *